United States Patent [19]

Iwamura et al.

[11] 3,997,891

[45] Dec. 14, 1976

[54] LIGHT PEN DETECTION SYSTEM

[75] Inventors: Masahiro Iwamura; Nagaharu Hamada; Yukitaka Hayashi, all of Hitachi, Japan

[73] Assignee: Hitachi, Ltd., Japan

[22] Filed: June 3, 1975

[21] Appl. No.: 583,408

[30] Foreign Application Priority Data

June 5, 1974 Japan .............................. 49-62895

[52] U.S. Cl. ..................... 340/324 AD; 250/549; 340/337

[51] Int. Cl.² ..................................... G06K 15/20

[58] Field of Search ........ 340/337, 324 A, 324 AD; 250/549

[56] References Cited

UNITED STATES PATENTS

| | | | |
|---|---|---|---|
| 3,506,875 | 4/1970 | Watanabe et al. | 340/324 A |
| 3,509,350 | 4/1970 | Gundrum | 340/324 A |
| 3,579,225 | 5/1971 | Clark | 340/324 AD |
| 3,832,485 | 8/1974 | Pieters | 340/324 A |
| 3,854,130 | 12/1974 | Ligocki | 340/324 AD |
| 3,877,018 | 4/1975 | Hakozaki | 340/337 |

*Primary Examiner*—David L. Trafton
*Attorney, Agent, or Firm*—Craig & Antonelli

[57] ABSTRACT

A light pen detection system used for a display system using a cathode ray tube (CRT) in which the operation for detecting the character display position on the CRT face is started when the operation switch of the light pen is turned on, and repeatedly progresses in synchronism with the picture repetition rate, and when a position marker is displayed at the character display position detected through such detecting operation, the operation switch of the light pen is turned off thereby to stop such detecting operation, whereby the character display position detected is obtained as the up-to-date one indicated by the light pen.

10 Claims, 15 Drawing Figures

FIG. 6

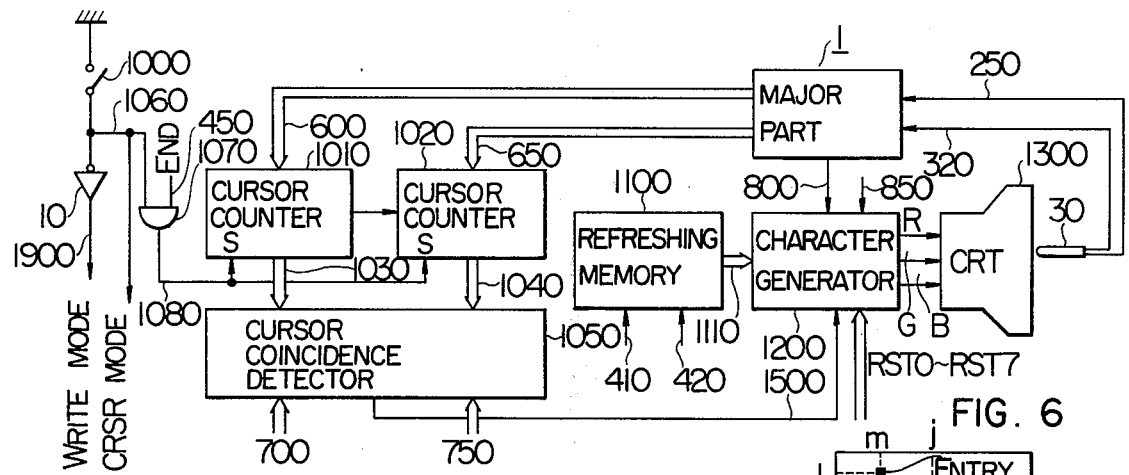
FIG. 5a
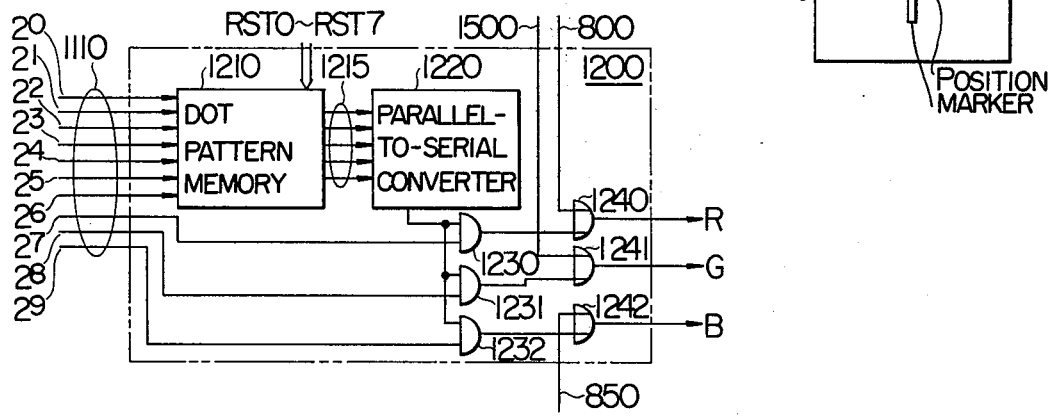
FIG. 5b
FIG. 6

LIGHT PEN DETECTION SYSTEM

BACKGROUND OF THE INVENTION

1. Field of the Invention

The present invention relates to a light pen detection system and more particularly to the one used for a display system of the raster scan type.

2. DESCRIPTION OF THE PRIOR ART

With recent prevalence of the process control by using electronic computers, monitoring items increase and controlled objects become large and complex. This background indispensably necessitates display systems as a means for man-to-machine communication. For the display systems, it generally is required to provide a write pen in order that an operator can easily communicate with the computer. The write or light pen is used for conveying the operator's intention to the computer through the picture of the display. Thus, it might be operable in an easy way and at a high precision. The causes of the erroneous operations of the light pen are:

a. Resolution of the light pen per se
b. Various noises
c. The light receiving face of the light pen incorrectly confronts the face of the CRT
d. Parallax, i.e. a change in the position of the operator's eyes when he observes it
e. When an ambiguous position (the boundary space between adjacent characters, for example) is indicated by the light pen
f. Others The erroneous operation due to causes (a) and (b) can be eliminated by precisely compensating for the character display position detected with some error and by using proper conventional noise prevention techniques. The causes (c) to (e) are all attributable to the operator's erroneous or improper operation of the light pen. The conventional light pen detection system is a so called one-touch and one-action system which is designed on the assumption that there is no occurrence of the erroneous operation by the operator as listed in causes (c) to (e). More precisely, in response to one switching operation of the light pen, the operation for detecting the character display position on the tube face is effected whether or not the character display position actually indicated by the light pen of the operator coincides with that desired by the operator.

However, it is very difficult to eliminate the parallax problem due to the change of the eye position with respect to the object for the reason that the face of the tube and the fluorescent screen are spaced 5 to 10 mm by the face plate and that the tube face is curved. Especially, in a high density display system in which huge numbers of characters are displayed on the tube screen, it would be almost impossible to obtain a correct indication by the light pen because of very small space between adjacent characters displayed. Thus, the existence of the adverse causes of (c) to (e) is inevitable at present-day technical level in this field. For this reason, the operator must perform the following troublesome operation. A desired character display position at first is provisionally detected and then the detected position is verified as whether or not it corresponds to the desired one. If this verification shows that it does not correspond to the desired one, such detecting operation will repeatedly continue until it will meet the desired one.

SUMMARY OF THE INVENTION

Accordingly, a principal object of the present invention is to provide a light pen detection system improved in that the above-mentioned disadvantages of prior art are overcome and an excellent detecting operation of the light pen is obtained with a high precision.

In accordance with present invention, there is provided a light pen detection system used for a display system of the raster scan type comprising a light pen for detecting a character display position on the CRT screen, a circuit for synchronizing the signal representing the beginning of the light pen detection operation with the raster scanning of picture, a circuit for generating a clock gate signal which is set by a signal produced when the synchronized signal representing the beginning of the light pen detection operation appears together with the leading edge of the vertical synchronizing signal of the CRT and is reset by a signal detected by the light pen produced when the electron beam has passed the character display position on the CRT screen indicated by the light pen, a pulse generator circuit for generating clock pulses once each period for which the electron beam scans one character display position on the CRT screen, horizontal address and vertical address counters for counting the clock pulses for the period the clock gate signal lasts, a latch register for latching the contents in these address counters each frame operation, a coincidence detector for producing a signal when the contents of the latch register coincide with the horizontal and vertical synchronizing signals, and a position marker generator which receives the output signal of the coincidence detector and produces a video signal for displaying the position marker, whereby the position marker is displayed on the position on the CRT screen indicated by the light pen.

The above and other objects, features and advantages will be apparent from the following detailed description taken in connection with the accompanying drawings.

BRIEF DESCRIPTION OF THE DRAWINGS

FIG. 5a is a block diagram of another embodiment of the present invention, and FIG. 5b illustrates in a block form the detail of a character generator used in the embodiment in FIG. 5a.

FIG. 6 is a diagram for illustrating the operation of the FIG. 5a circuit.

DESCRIPTION OF THE PREFERRED EMBODIMENTS

The present invention will be described hereinafter with reference too the accompanying drawings. In the description of this specification, a minimum area on the screen required to form a character (or a single symbol) is comprised of 7 dots in the horizontal length and 8 raster lines in the vertical length. It is to be understood, however, that this size of a single character is used only by way example and not as a limitation on the present invention.

Figure 1:
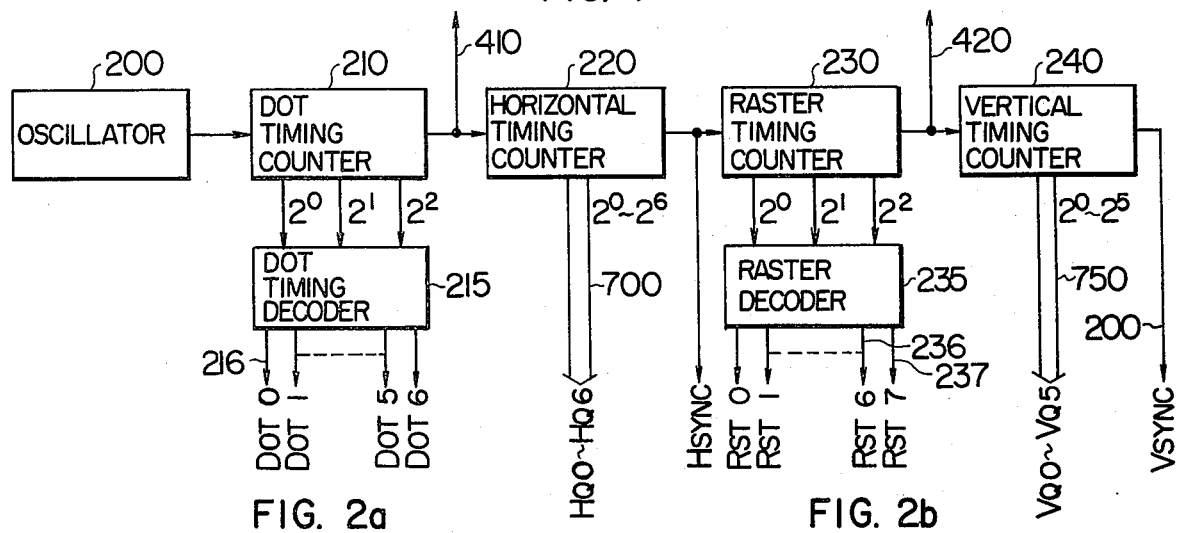
FIG. 1 is a block diagram of a timing signal generator circuit used in the display system of the raster scan type.

Referring now to FIG. 1, there is shown a timing signal generator circuit for generating timing signals for the horizontal scanning and the vertical scanning of a cathode ray tube. In the figure, reference number 200 designates an oscillator for generating a reference clock signal. Numeral 210 designates a dot timing counter which is of a heptadecimal counter for determining the number of dots forming the horizontal length of one character. Numeral 215 is a decoder for decoding the output signal from the dot timing counter 210 to generate a series of dot signals DOT 0, DOT 1, . . . DOT 5 and DOT 6. The carry out of the dot timing counter 210 is transferred as a clock signal to a horizontal timing counter 220. The horizontal timing counter 220 is used to determine the number of characters to be displayed on each line, and the carry produced by the horizontal timing counter 220 is transferred as a horizontal synchronizing signal HSYNC to the horizontal deflection circuit of the CRT, while at the same time applied as a clock signal to a raster timing counter 230. The raster timing counter 230 determines the number of raster lines required to form one character, and is of an octadecimal counter since the raster lines in the vertical direction of each character is 7 in number. The carry from the raster timing counter 230 is supplied as a clock signal to a vertical timing counter 240. Numeral 235 designates a raster decoder which decodes the output of the raster timing counter 230, thereby outputting a series of raster signals RST 0, RST 1, . . . RST 6 and RST 7. The vertical timing counter 240 determines the number of raster lines available for character display per one frame, and the carry from the vertical timing counter 240 is applied as a vertical synchronizing signal VSYNC to the vertical deflection circuit of the CRT. As just mentioned, the horizontal and the vertical deflection timing signals HSYNC and VSYNC are obtained by sequentially counting down the output signal of the reference clock signal oscillator 200 through the dot timing counter 210, the horizontal timing counter 220, the raster timing counter 230, and the vertical timing counter 240. The raster scanning of the CRT is carried out by the horizontal and the vertical deflection timing signals HSYNC and VSYNC.

By the way, the light pen is used to detect the positional address (the position on the tube face expressed in terms of the coordinates of the horizontal direction and the vertical direction) on the basis of detection of the picture, characters, symbols, or the like (hereinafter referred simply to as a character), these of which are displayed by scanning by the electron beam. Accordingly, it is impossible to detect the positional address on the tube face where nothing is displayed. It is for this reason that all of the dots on the entire tube surface are intensified during a fractional length of time from turning the operation switch of the light pen on to the completion of operation of the light pen, or there are provided a plurality of markers for the detecting operation of the light pen being correspondingly arranged on the respective positions on the tube face where displayed characters are located. The former method is undesirable in that since the entire surface of the CRT is monochromatically illuminated, although for a very short time, an operator will feel uncomfortable because of the residual image characteristic of human eyes. The latter method is desirable on the ground that it has no such defect and that the markers employed each gives an indicia of the position where each character is to be displayed when the operator approaches to that position on the tube face for the detecting operation of the light pen.

Figure 2A:
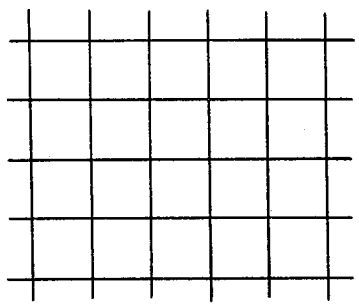
FIGS. 2a and 2b are examples of markers enabling the light pen detection operation even when no character is displayed on the character display position.
Figure 2B:
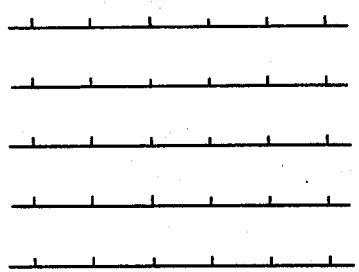
Figure 2C:
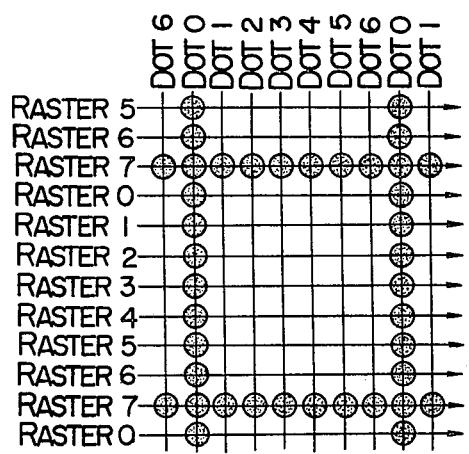
FIGS. 2c and 2d illustrate the details of the markers shown in FIGS. 2a and 2b, and FIGS. 2e and 2f are marker generating circuits for the markers in FIGS. 2a and 2b, respectively.
Figure 2D:
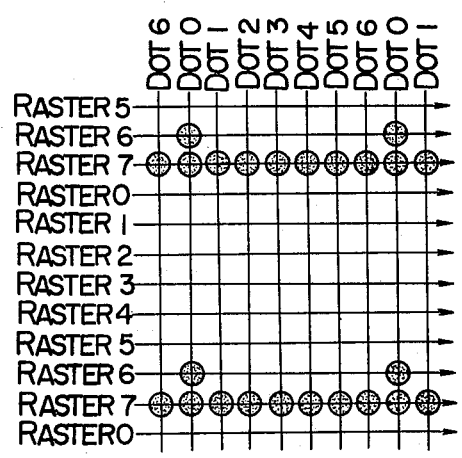
Figure 2E:
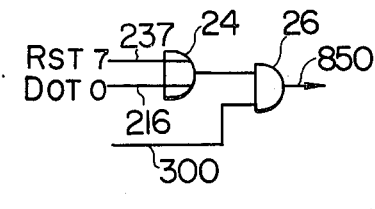
Figure 2F:
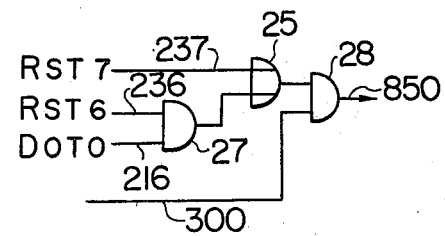

In the display system using a light pen detection system embodying the present invention, a plurality of markers for aiding the detecting operation of the light pen are correspondingly disposed on the respective character display positions on the tube face, in order that the detecting operation of the light pen is possible even on the space portions on the tube surface (the character positions where no character information are displayed). These markers are shown in FIGS. 2a and 2b by way of example. FIG. 2c is an enlargement of a part of the markers (a grid-like display) in FIG. 2a, and FIG. 2d shows an enlargement of a part of markers (a linear display in FIG. 2b. Marker generator circuits for generating the markers shown in FIGS. 2a and 2b are shown in FIGS. 2e and 2f. The marker generator shown in FIG. 2e for generating grid like markers is comprised of an OR circuit 24 taking an "OR" output from a signal RST7 (237) of the last rester line of the respective lines each consisting of a series of character positions and a signal DOT 0 (216) representing a first dot in each of the character positions, and an AND circuit 26 taking an "AND" output from the output signal of the OR circuit 24 and an ON signal produced when the write pen is turned on. The output signal 850 from the AND circuit 27 is fed to a character generator (not shown) for displaying the markers as shown in FIG. 2a on the tube face. The character generator circuit shown FIG. 2f for generating linear markers is comprised of an AND circuit 27 taking an AND output from a raster signal RST6 (236) representing the 7th raster line on each of the lines each consisting of a series of character positions and a signal DOT 0 (216) indicative of a first dot of each of character positions, an OR circuit 25 taking an OR output from the output signal of the AND circuit 27 and a signal RST7 (237) representative of the last raster line of each of the lines each consisting of a series of character positions, and an AND circuit 28 taking an AND output from the output signal of the OR circuit 25 and an ON signal 300 produced when the operation switch of the write pen is turned on. The output signal 850 of the AND circuit 28 is supplied to the character generator thereby forming the markers as shown in FIG. 2b on the CRT surface.

Figure 3A:
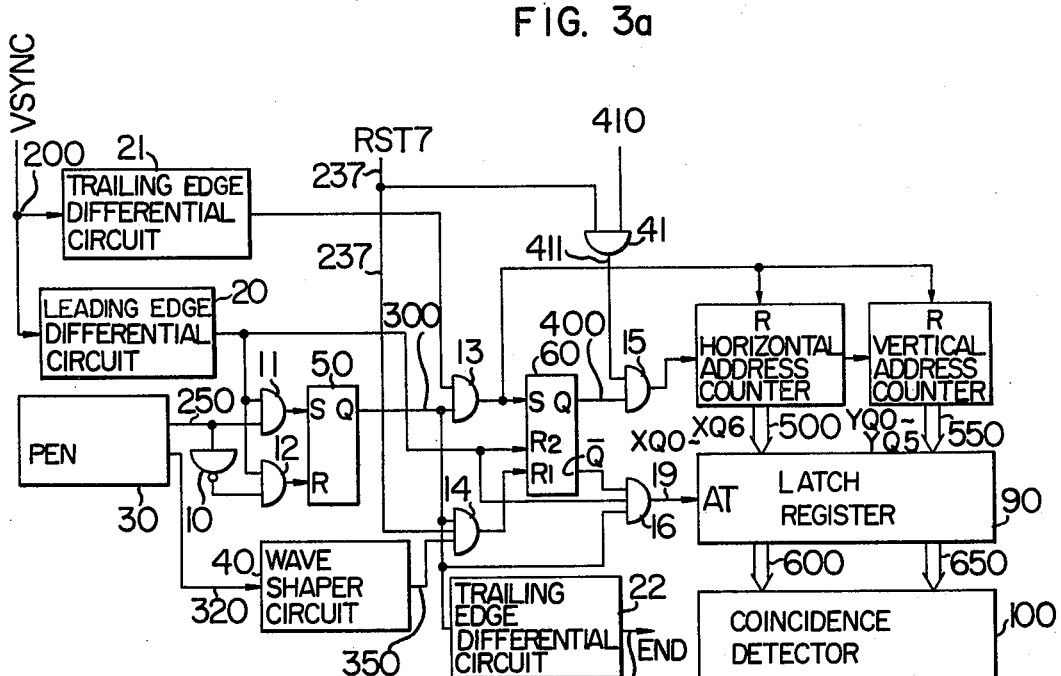
FIG. 3a is a block diagram of an embodiment of the present invention.
Figure 3B:
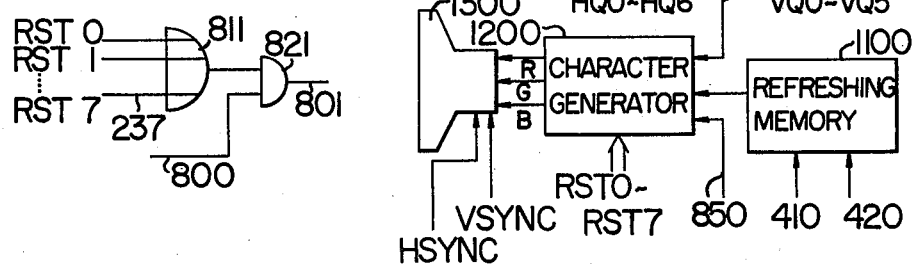
FIG. 3b is a circuit diagram of one form of a position marker generators.
Figure 4:
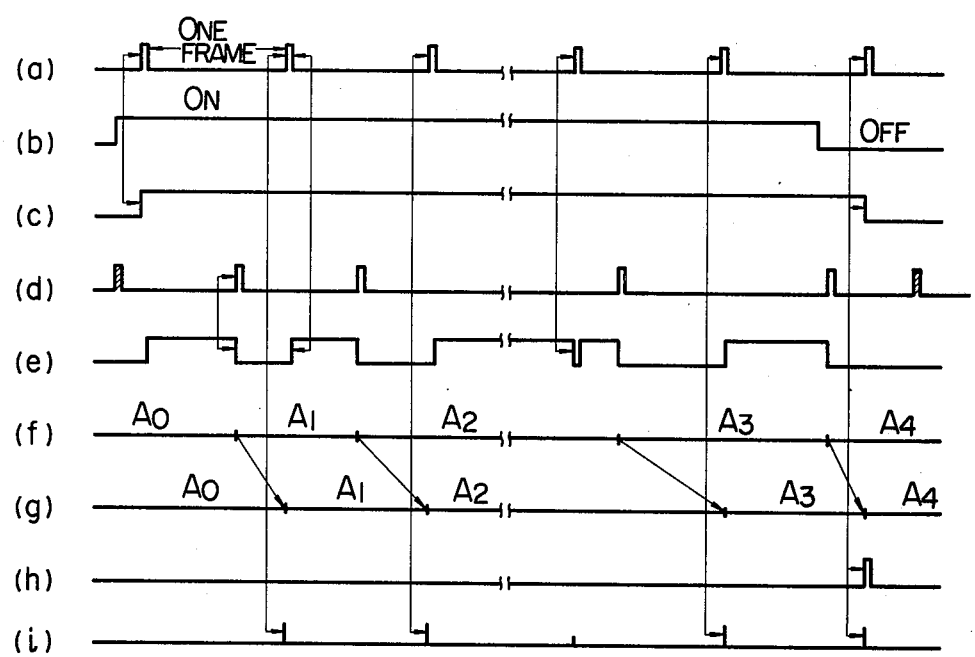
FIG. 4, consisting of 4a through 4j, is a set of wave forms of chief circuits in the circuitry in FIG. 3.

An embodiment of the present invention will be described hereinunder. FIG. 3a is a block diagram of the embodiment of the present invention, and FIG. 4 is a set of waveforms of the major portions of the FIG. 3a circuit. In FIGS. 3a and 3b, reference numeral 10 designates a NOT circuit, numerals 11 to 16 show AND gates, numeral 20 designates a leading edge differential circuit, numerals 21 and 22 trailing edge differential circuits, 30 a light pen, 40 a wave shaper circuit, 50 and 60 flip-flops, 70 a horizontal position counter, 80 a vertical position counter for counting the vertical position of the light pen 30, 90 a latch register, and 100 a coincidence detector. TTL MSI, SN74161, SN74174, and SN7485 manufactured by Texas Instruments Corporation are used without any modification for the horizontal position counter 70, the vertical position counter 80, the latch register 90, the the coincidence detector circuit 100, respectively.

With such construction, when the switch (not shown) of the light pen is turned on, the switch signal 250 becomes generator 1, and its waveform is shown in FIG. 4b. The vertical synchronizing signal 200 (shown in FIG. 4a) output from the timing signal generator circuit (see FIG. 1) when the switch signal is 1 is differentiated at the leading edge differential circuit 20 which in turn enables the AND gate 11 to open and the output of the AND gate 11 sets a flip-flop 50 (hereinafter abbreviated as FF). The FF 50 is kept on the "set" condition until the switch signal becomes O and the subsequent vertical synchronizing signal 200 is produced. The Q output signal 300 of the FF 50 is equivalent to the switch signal synchronizing with the picture repetition rate and its waveform is shown in FIG. 4c. When Q output signal 300 becomes 1, the vertical synchronizing signal 200 output drives the trailing edge differentiator 21 to produce a differentiated pulse which enables the AND gate 13 to open and then its output signal sets the FF 60. Reference numeral 320 is a signal produced when the light pen is operated in detection. The detected signal 320 is wave-shaped in a wave-shaper circuit 40 and then fed to an AND gate 14. The output signal 350 of the wave-shaper circuit is a signal of the light pen output signal in terms of the logic level, and its waveform is as shown in FIG. 4d. When the switch signal 300 as well as the signal 237 of the RST7 is 1, the AND gate 14 is enabled to open in response to appearance of the output signal 350 if the light pen 30 detects an illumination at a certain position on the tube face. In short, in this instance, the light pen 30 detects the character positions each permitting one character to be located in display when the electron beam scans the 7th raster line (the last raster line in each line consisting of a series of character positions) of the markers displayed on the CRT surface by using the marker generator shown in FIG. 2e or 2f. Upon receipt of the output signal of the AND gate 14, the FF 60 is reset so that the clock gate signal 400 as shown in FIG. 4e turns O. Another reset terminal of the FF 60 is connected with the output of the leading edge differential circuit 20 for forcibly resetting the FF 60 to restore it to its original state at the end of one frame repetition for ensuring the continuity of motion. This connection is used for preventing the counters 70 and 80 from erroneously counting in response to the clock signal of the subsequent frame, when the light pen fails to detect the illumination on the CRT screen for some reason or other (for example, in case the light pen is positioned at too great a distance from the CRT screen to ensure the detecting operation of the light pen). Q output signal 400 of the FF 60 is transferred to an AND gate 15 serving to control the supply of the clock signal 410 to the horizontal address counter 70 and the vertical address counter 80. Clock signal 411 is generated once each period during which the electron beam scans each of the character display positions, and is obtained in such a manner that the carry output 410 from the dot timing counter 210 shown in FIG. 1 is produced only when the raster signal RST7 appears. With the use of the raster signal RST7 as a gate signal of the AND gate 41, the AND gate 41 produces during one line display period a series of pulses whose number corresponds to that of characters to be displayed on one line. In other words, the AND gate 41 produces one signal per each period of one character display. Generally, the clock signal 411 is a pulse signal produced one each character display, and thus, in the display system with 80 characters per line and 40 lines per frame, for example, generated is a pulse train consisting of 3200 pulses per frame, i.e. 80 ×40 = 3200. At the beginning of the detecting operation of the light pen, the counters 70 and 80 are reset by the output signal of the AND gate 13 to return to their original states, and start to make a progression of counter operation thereof as the scanning operation progresses on the CRT screen. When an overflow occurs in the counter 70 (it occurs as the counter 70 completes its counting operation of all the characters included in one line), the counter 70 restores its original state 0 while at the same time produces a carry output of one pulse. Upon receipt of the carry output, the counter 80 counts up by one. When the election beam presently scans the 75th character on the 40th line, for example, the counter 80 has counted up to 40° while the counter 70 to 75. At this time, when the light pen 30 detects this character display position, the light pen output signal 350 is produced. The output signal 350 produced enables the AND gate 15 to open and its output in turn is applied to the FF 60. Upon receipt of the output signal of the AND gate 14, the FF 60 is reset and therefore the AND gate 15 is enabled to close. The closing of the AND gate causes the counters 70 and 80 to stop in counting operation, while holding the character display position detected by the light pen. The output signals 500 and 550 of the horizontal and vertical address counters 70 and 80 are transferred to the latch register 90 through its data input terminals when received a register setting signal 19 from the AND gate 16. It is of course that the register setting signal 19 is obtained when the AND gate 16 is enabled to close. The wave form of the register setting signal 19 is shown in FIG. 4i. The AND gate is fully opened when the output signal of the leading edge differential circuit 20 as well as the switch output signal 300 is in the logical 1 and further the FF 60 is reset. That is to say, the contents of the vertical and the horizontal address counters 70 and 80 are transferred to the latch register 90 when the light pen 30 receives a ray of lights from the CRT screen (at this time, the Q output from the FF 60 is 1) during the detection cycle in the detecting operation of the light pen (for the period permitting the output signal 250 of the switch of the light pen to be kept 1), and further at the end of the detection cycle. So far as the light pen switch is turned on, the switch output signal 300 is held at the logical 1 so that the similar operation of the character display position will be repeated in synchronism with the picture repetition rate. Through this repetitive operation, the latch register 90 constantly holds the up-dated character display position detected by the light pen. Designated by reference numerals 700 and 750 are horizontal and vertical synchronizing signals in the display system. A coincidence detector 100 produces signal for displaying a position mark when the output signals 500 and 550 of the vertical and the horizontal address counters 70 and 80 coincide with the horizontal and the vertical synchronizing signals 700 and 750 for display. The position mark display signal 800 is used for displaying the marker (referred to as a positon marker) on the character display position on the CRT screen which is indicated by the light pen of the operator. The mark display signal 800 is connected with a character generator 1200 where it is converted into a video signal which in turn is applied to any one or some of the cathodes for three primary colors R, G and B, (red, green and blue), of the CRT 1300. Accordingly, the position marker with a desired color is displayed on the character display position on the CRT 1300 screen which is indicated by the light pen of the operator. Of course, a suitable color may be selected by properly selecting any of these electrodes of three primary colors R, G and B, (red, green and blue). Although, in this preferred embodiment, a video signal generator (referred to as a position marker generator) for displaying the position marker on the tube face is provided in the character generator 1200, its use is optional. Another position marker generator as shown in FIG. 3b, for example, may be used separate from the character generator 1200 in such a connection that it is connected at its output 801 with any desired cathode of the CRT 1300. In FIG. 3b, the position marker generator includes an OR circuit 811 and an AND circuit 821, and the marker signal generated from this marker generator illuminates the entire character display position (a small area permitting one character to be displayed thereon) detected by the light pen 30. A detailed description of the case that the position marker generator is included in the character generator 1200 will be made in the explanation of another embodiment of the present invention. Returning again to FIG. 3a, when the switch of the light pen is turned off, the switch signal 300 turns 0, at the leading edge of the next vertical synchronizing signal, and the subsequent position detecting operation will not be repeated. As a result, held in the latch register 90 is the address of the character display position detected in the last detecting operation of the write pen 30. In this way, the character display position is detected by the light pen. In this invention, the position marker is displayed on the character display position actually indicated by the light pen of the operator, and the detecting operation of the character display position will be repeated as long as the detecting operation of the light pen continues. Accordingly, in case the character display position at which the position mark is displayed is different from the desired one of the operator, the desired character display position may correctly be detected if the operator moves the light pen to the desired one and the switch of the light pen is turned off as the position marker is displayed at the desired character display position through the movement of the position marker thereat. In the embodiment in FIG. 3, when the switch output signal 300 is changed from the logical 1 to 0, the trailing edge differential circuit 22 outputs an end signal 450 of operation (FIG. 4h). When this end signal 450 is produced, the following operations may be effected by using the output signals 600 and 650 of the latch register 90:

1 To move an entry marker (the marker for informing the operator of the character display position for effecting "write", "delete" and "read out" of information) to the character display position indicated by the light pen 30 (the character display position on which the position marker is displayed).

2. To write the information displayed on the position indicated by the light pen 30 into the position where the entry marker is displayed.

3. To apply an address interruption to an external apparatus (a computer and the like) by which the information to be displayed is supplied.

4. Others

Incidentally, reference characters $A_0$, $A_1$, $A_2$, $A_3$, and $A_4$ in FIG. 4f designate the respective positonal addresses on the tube face which are set by the horizontal and the vertical address counters 70 and 80 through the character detecting operation by the operator. Reference numerals $A_0$ to $A_4$ shown in FIG. 4g represent the respective positional addresses which are transferred to the latch register 90.

Another embodiment of the present invention (an application of the present invention) will next be described.

Referring now to FIG. 5a, there is shown a control circuit for moving the entry marker to the position on the tube face indicated by the light pen. In the figure, reference numeral 1100 designates a refreshing memory for sequentially supplying display data to be displayed in one frame to the character generator 1200 in synchronism with the raster scanning operation. For further detail of the operation of the refreshing memory, the U.S. Pat. No. 3631457, for example, should be referred to. A character generator 1200 operates to convert the incoming data for display into a character shape, and serially produces video signals. A further detail of the character generator 1200 is illustrated in FIG. 5b. In FIG. 5a, a CRT 1300 is a color picture tube. Vertical and a horizontal cursor counters 1010 and 1020 serve to store the character display position of the entry marker. A cursor coincidence detector 1050 produces a cursor coincidence signal 1500 only when the outputs of the cursor counters 1010 and 1020 coincidence with the vertical and the horizontal display timing signals 700 and 750. The cursor coincidence signal 1500 is fed to the character generator 1200 where it is converted into a video signal which in turn is applied to the cathode of the CRT for displaying an entry marker on the screen of the CRT. Reference numeral 1 denotes a major part of the light pen detection system, and includes all the circuits in FIG. 3a except the light pen 30, the refreshing memory 1100, the character generator 1200, and the CRT 1300. An explanation will be made about the case where the entry marker located at the coordinates $(l,m)$ is moved to the coordinates $(i,j)$ indicated by the write pen 30. It is assumed now that a signal CRSR MODE 1060 for shifting the entry marker to the display position of the position marker now displayed is output as 1. That is, this condition is such that a mode switch 1000 is turned off by an external operation. The operator turns on the operation switch of the light pen 30, and shifts the position marker to the coordinates $(i,j)$ in FIG. 6. After ascertaining that the position marker is positioned at the desired place of $(i,j)$, the operator turns the operation switch off. At this time, in the latch register 90 in the major part of the light pen detection system, the information representing the position $(i,j)$ on the face of the tube is stored. At first, the position information of $(l,m)$ is set in the horizontal cursor counter 1010 and the vertical cursor counter 1020. At the time the operation switch is turned off, the end of operation signal 450 occurs. Upon appearance of the end signal, an AND gate 1070 is enabled to produce a counter set signal 1080. The counter set signal 1080 sets the cursor counters 1010 and 1020 to have the respective position information $(i,j)$ which have been stored in the latch register 90. The cusor coincidence detector 1050 produces the coincidence signal 1500 when the output 700 of the horizontal timing counter is $i$ and the output 750 of the vertical timing counter is $j$. Thus produced coincidence signal is fed to the character generator 1200 where it is converted into a video signal which in turn is applied to the cathode of the CRT 1300. As previously mentioned, this coincidence signal 1500 output from the cursor coincidence detector 1050 is such that it is produced when the respective display timing signals coincide with the corresponding outputs of the cursor counters 1010 and 1020 which are the contents of the latch register 90 at the end of the light pen operation. This means that the coincidence signal 1500 is produced in synchronism with the position marker display signal 800. Therefore, the entry marker moves to the position of the position marker. Such movement of the position marker is used when writing information such as a character into a given display position on the tube face of, for example, $(i,j)$, when reading it out of such position, and when correcting it located on such position. In the conventional display system, it is common practice to write a character, for example, into the display position of the entry marker, to read it out of such position, or to correct it located on such position through the operation of the switch on the keyboard. The device of this embodiment enables those operations to be effected more rapidly and more accurately, when compared with such conventional one. The character generator 1200 for converting the data from the memory 1100 into a series of video signals will be explained with reference to FIG. 5b. The character generator in the figure includes a position marker generator, and an entry marker generator, a specifying marker generator. In the figure, reference numeral 1110 designates a group of lines connected with the refreshing memory 1100 for transmitting the character data therethrough consisting of 7 bits ($2^0$ to $2^6$) designating the characters to be displayed and 3 bits ($2^7$ to $2^9$) designating the colors of the those characters. Reference numeral 1210 denotes a dot pattern memory generally made of a read only memory (ROM) which generates a dot pattern signal 1215 representing the width of each character which is formed of not exceeding 5 dots arranged along one raster line. The generation of the dot pattern signal is made in response to the character information of 7 bits and one of the raster signals RST0 to RST7 indicating what raster line is presently scanned by the electron beam of the display. Designated by the reference numeral 1220 is a parallel-to-serial converter for converting the parallel 5-dots pattern signal 1215 into a series of video signals. The video signal 1225 output from the parallel-to-serial converter 1220 is coupled with one of the input terminals of each of the AND gates 1230, 1231, and 1232. The other input terminals of these AND gates are coupled with the corresponding output lines 1110 from the refreshing memory 1100 which carry the color designating bits $2^7$ (RED), $2^8$ (GREEN) and $2^9$ (BLUE), respectively. A combination of these color designating bits $2^7$ to $2^9$ permits the character information to be displayed in 7 colors. The output of the AND gate 1230 is connected to one of the input terminals of an OR gate 1240. The outputs of the AND gates 1231 and 1232 are connected to such terminals of OR gates 1241 and 1242.

The other input terminal of the OR gate 1240 is coupled with the position marker display signal 800 output from the coincidence detector 100. The other input terminal of the OR gate 1241 is connected with the entry marker display signal 1500 output from the cursor coincidence detector circuit 1050. The other input terminal of the OR gate 1242 is coupled with the output 850 of the specified marker generator (FIG. 2e or 2f). The outputs R, G and B of the OR gates 1240, 1241 and 1242 are applied to the corresponding cathodes of the display CRT, respectively. In this character generator, the position marker is displayed in RED since the position marker display signal 800 is connected to the OR gate 1240 outputting R signal. Similarly, the entry marker is displayed GREEN and the specified marker BLUE. The colors of the respective markers may desirably be selected by making proper connection of the color signals 800, 1500 and 850 to the OR gates 1240, 1241 and 1242. The respective markers are not always colored with different colors to each other. It is desirable, however, that, in practical use, those are colored with different colors. In this example, the position marker and the entry marker are so designed that the entire area of each of the respective display positions is illuminated. However, the shapes of those markers are not limited to such. It would rather be preferable that the position marker and the entry marker are different to each other in shape for obtaining a good distinction therebetween.

Figure 7:
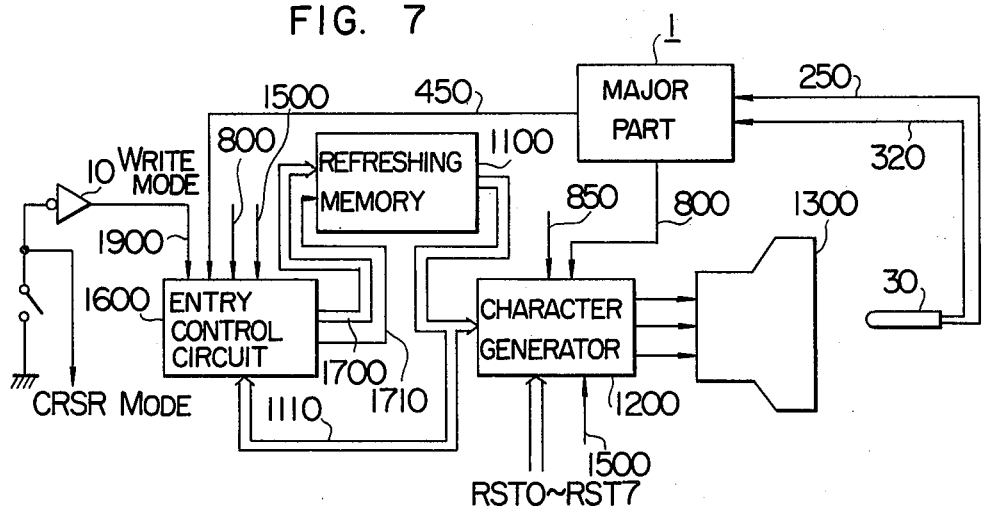
FIG. 7 shows a block diagram of still another embodiment of the present invention.
Figure 8:
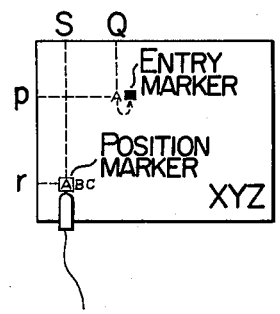
FIG. 8 is a diagram for illustrating the operation of the FIG. 7 circuit.
Figure 9:
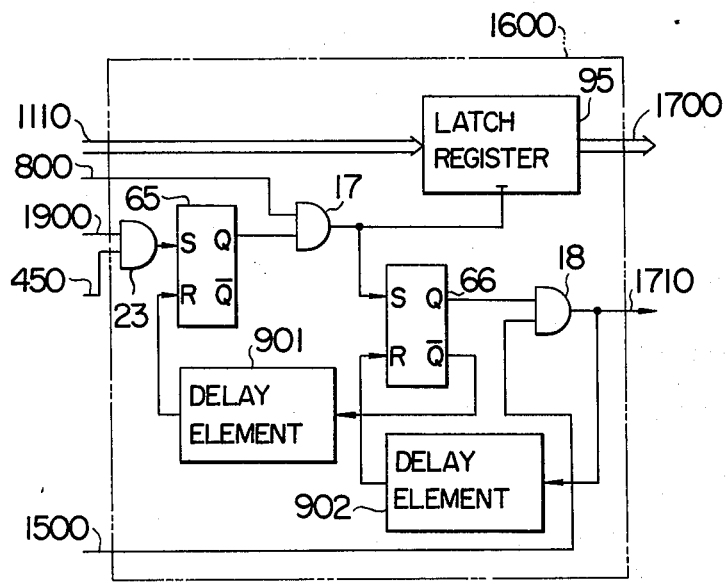
FIG. 9 illustrates in a block form the detail of an entry marker control circuit used in the FIG. 7 circuit.

Still another embodiment (another application) of the present invention will be described with reference to FIGS. 7 to 9. Referring now to FIG. 7, there is shown a control circuit in which the character to be displayed on a certain display position on the tube face which is detected by the light pen, is written into the display position of the entry marker. In the figure, an entry control circuit 1600 receives a WRITE MODE signal 1900 representing a write mode, the position marker display signal 800 output from the coincidence detector 100, the entry marker display signal 1500 from the cursor coincidence detector 1050, and the output signal 1110 of the refreshing memory 1100. A detail description of the operation of the entry control circuit 1600 will subsequently be made with reference to FIG. 9. Reference numeral 1700 designates the write-in data loaded into the refreshing memory 1100 and the numeral 1110 is the read-out data read out of the refreshing memory 1100. Reference numeral 1710 is representative of a write-in instruction signal. The character generator 1200 is the same as that shown in FIG. 5b. Designated by reference numeral 1300 is a color display CRT. In response to the write-in instruction from external, the WRITE MODE signal 1900 is assumed to be 1 of the logical level. An explanation below will be made about the case that the character information A located at the display portion of coordinates $(r,s)$ indicated by the light pen 30 is written into the display portion $(P,Q)$ where the entry marker is located, as shown in FIG. 8. At first, the operation switch of the light pen 30 is turned on and it is approached to the display CRT 1300, thus resulting in generation of position marker. Then, the position marker generated is moved to the display position of $(r,s)$ by moving the write pen 30. After ascertaining that the position marker is located at that display position, the operation switch is turned off. By this operation, the coordinates $(r,s)$ are stored in the latch register in the major part of the light pen detector 1, and the position marker display signal 800 is output in synchronism with the scanning of the electron beam on the display position specified by the coordinates (r,s). The entry control circuit 1600 receives the character information A located at the display position of (r,s) through the output signal 1110 of the refreshing memory 1100, synchronizing with the position marker display signal 800, and the character information received is temporarily stored in the register (not shown) in the entry control circuit. Following this, the entry control circuit 1600 produces the write-in instruction signal 1710 in synchronism with the output signal 1500 of the cursor coincidence detector, so that the character information A temporarily stored is loaded into the refreshing memory 1100. The result is that the character information A to be displayed at the position of (r,s) detected by the light pen is written into the position of (P,Q) of the entry marker. The entry control circuit 1600 effecting an important control in this instance will be described in detail referring to FIG. 9. In the figure, the operation end signal 450 of the light pen 30 generated when the WRITE MODE signal 1900 is 1 fully enables AND gate 23 to open and the output thereof in turn sets FF 65 to be 1 at its Q output terminal. After this, an AND gate 17 is enabled to open synchronizing with the entry marker display signal 800 of the coincidence detector 100, and the output of the AND gate is applied to T-terminal of the latch register 95. In this manner, the latch register 95 stores the output data 1700 from the refreshing memory 1100 which is timed to output of the entry marker display signal 800. In other words, the latch register 95 stores the data code and color code these of which specify the character A displayed at the position of (r,s). At the same time, the output of the AND gate 17 is fed to the set terminal S of FF 66, thereby setting FF 66. By setting of FF 66, its Q output becomes 0. This O output is delayed a necessary time at a delay element 902 and then is transferred to the reset terminal R of FF 65 for resetting it. After resetting the FF 66, the entry marker display signal 1500 output from the cursor coincidence detector 1050 is applied to an AND gate 18 thereby being enabled to produce an output signal 1710 which in turn is applied to the refreshing memory 1100. The output signal 1710 is also to applied to a delay element 1710 where it is delayed a necessary time and is then fed to the reset terminal of the FF 66 for resetting it. Those delay elements 901 and 902 are used to provide necessary pulse widths of the output signals of the AND gates 17 and 18. The output signal 1710, i.e. the write-in instruction signal, is produced from the AND gate 18 as the write-in instruction signal 1710 is output in synchronism with the electron beam scanning the entry marker display position on the tube face. Upon generation of the write-in instruction signal 1710, the data code and the color code corresponding to the character information of A stored in the latch register 95 is loaded into the refreshing memory 1100. This means that the character A stored in the latch register 95 is ready to be displayed on the display position of the coordinates (P,Q) on the tube face. That is, in this way, the character information of A displayed on the display position on the tube face indicated by the light pen 30, i.e. the contents of the latch register 95, may be displayed on the display portion of (P,Q) on which the entry marker is displayed. Repetition of the similar operation enables the character to be displayed on the desired display position of the tube face.

As described in the above, in the light pen detection system according to the present invention, a character display position on the tube face is repeatedly detected corresponding to the picture repetition rate when the light pen is operated for detection, and thus the position marker is displayed on the updated display position on the tube face indicated by the light pen. Therefore, an operator can change at will the position on the tube face pointed out by the light pen while observing the position marker moving with the movement of the light pen, and when the position marker is located on the desired character display position on the tube face, he stops the detecting operation of the light pen. This manner of the light pen operation brings about an easy and accurate operation.

We claim:

1. A light pen detection system for use in a display system of the raster scan type having a memory for storing the information to be displayed and for reading out that information in synchronism with the raster scanning of the cathode ray tube, a character generator producing the video signal in response to the output of the memory, and a display portion for receiving the video signal and for displaying the information comprising: a light pen for detecting a character display position on the face of the cathode ray tube; a circuit for synchronizing a signal representing the beginning of the light pen detection operation with the raster scanning of picture; a circuit for generating a clock gate signal which is set by a signal produced when said synchronized signal representing the beginning of the light pen detection operation appears together with the leading edge of the vertical synchronizing signal of the cathode ray tube and is reset by a signal detected by the light pen produced when the electron beam has passed the character display position on the cathode tube screen indicated by the light pen; a pulse generator circuit for generating clock pulse once each period for which the electron beam scans one character display position on the cathode ray tube screen; horizontal and vertical address counters for counting said clock pulses for the period said clock gate signal lasts; a latch register for latching the contents in these address counters each frame operation; a coincidence detector for producing a signal when the contents of the latch register coincides with the horizontal and vertical synchronizing signals; and a position marker generator which receives said output signal of the coincidence detector and produces video signals for displaying the position marker, whereby the position marker is displayed on the position of the cathode ray tube screen indicated by the light pen.

2. A light pen detection system according to claim 1, in which said position marker generator is included in said character generator.

3. A light pen detection system according to claim 1, further comprising a specifying marker generator for generating a specifying marker display signal for displaying a specifying marker on the CRT screen for aiding in detecting the character display position, and for feeding said specifying marker display signal into said display portion.

4. A light pen detection system according to claim 3, in which said specifying marker generator operates from the generation of said starting signal of the light pen detection operation to the generation of an end signal of the same.

5. A light pen detection system according to claim 1, further comprising: horizontal and vertical cursor counters for storing the display position of an entry marker used to designate the display position to which the information is written or from which the information is deleted; and a cursor coincidence detector for producing a coincidence signal into said character generator circuit when the contents of said cursor counter coincides with said horizontal and vertical display timing signals of the cathode ray tube, whereby the contents of said latch register are transferred to said cursor counter in response to said operation end signal of the light pen.

6. A light pen detection system according to claim 5, in which, when said display system is operated in color, said position marker is different from said entry marker in color.

7. A light pen detection system according to claim 5, in which said position marker is different from said entry marker in shape.

8. A light pen detection system according to claim 3, further comprising: horizontal and vertical cursor counters for storing the display position of the entry marker to designate the display position to which the information is written or from which the information is detected; and a cursor coincidence detector for producing a coincidence signal into said character generator circuit when the contents of said cursor counter coincides with said horizontal and vertical display timing signals of the cathode ray tube, whereby the contents of said latch register is transferred to said cursor counter in response to said operation end signal of the light pen.

9. A light pen detection system according to claim 8, in which, when the video signals of said position marker, said specifying marker, and said entry marker are applied to the electron gun of a color cathode ray tube, said respective markers are displayed in proper colors by suitably selecting said electron gun.

10. A light pen detection system according to claim 1, further comprising: horizontal and vertical cursor counters for storing the display position of the entry marker to specify the position to which the information is written or from which the information is deleted; a cursor coincidence detector for producing a coincidence signal into said character generator when the contents of said cursor counter and said horizontal and vertical displaying timing signals of the cathode ray tube; a first flip-flop being set when a write instruction signal given from external appears together with said end signal representing the end of the light pen operation; a data register for latching the output from said memory when the output from said first flip-flop appears together with the output from said coincidence detector; and a second flip-flop being set by said output of said first flip-flop and said output from said coincidence detector, whereby the contents in said data register are transferred to said memory when the output of said second flip-flop appears together with the output of said cursor coincidence detector for the entry marker display.

* * * * *